United States Patent Office 3,166,519
Patented Jan. 19, 1965

3,166,519
PREPARATION OF ORGANOBORANES AND ORGANOALUMINUM-NITROGEN POLYMERS
William G. Woods, Anaheim, Calif., assignor to United States Borax & Chemical Corporation, Los Angeles, Calif., a corporation of Nevada
No Drawing. Filed Nov. 3, 1960, Ser. No. 66,915
14 Claims. (Cl. 260—2)

The present invention relates to a new method for the preparation of organoboranes and thermally stable organoaluminum-nitrogen polymers.

Prior art processes for the preparation of organoboranes have been exceedingly expensive since they can only be performed in small batch multi-step processes which require long reaction periods. The preparation of organoaluminum-nitrogen polymers has also met with similar difficulties in addition to the fact that only a few polymers could be prepared by the known method of preparation. I have now discovered a new method by which both organoboranes and an increased number of organoaluminum-nitrogen polymers can be produced simultaneously in a single-step reaction which results in high yields of substantially pure organoboranes and which is economically attractive.

It is, therefore, the principal object of the present invention to provide a new method for the preparation of substantially pure organoboranes.

It is a further object of this invention to provide a single-step reaction for the simultaneous preparation of organoboranes and thermally stable organoaluminum-nitrogen polymers.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the many ways in which the principle of the invention may be employed.

Broadly stated, the present invention comprises the method for preparing organoboranes and organoaluminum-nitrogen polymers which comprises reacting a substituted borazole having the formula $(XBNR')_3$ with an organoaluminum compound having the formula $AlR_3$ in an inert solvent, slowly distilling the reaction mass, recovering substantially pure organoborane as the distillate, and recovering said organoaluminum-nitrogen polymer from the residue, where R is a material selected from the group consisting of unsubstituted saturated aliphatic hydrocarbon radicals, phenyl and substituted phenyl radicals having unsubstituted saturated aliphatic hydrocarbon substituents, X is a material selected from the group consisting of chlorine, bromine, unsubstituted saturated alkoxy radicals, phenoxy radicals, unsubstituted saturated aliphatic hydrocarbon radicals, unsubstituted aromatic hydrocarbon radicals, substituted aromatic hydrocarbon radicals having unsubstituted saturated aliphatic hydrocarbon substituents, unsubstituted heteroaromatic hydrocarbon radicals and substituted heteroaromatic hydrocarbon radicals having unsubstituted saturated aliphatic hydrocarbon substituents and R' is a material selected from the group consisting of hydrogen, unsubstituted saturated aliphatic hydrocarbon radicals, unsubstituted aromatic hydrocarbon radicals, substituted aromatic hydrocarbon radicals having unsubstituted saturated aliphatic hydrocarbon substituents, unsubstituted heteroaromatic hydrocarbon radicals and substituted heteroaromatic hydrocarbon radicals having unsubsttiuted saturated aliphatic hydrocarbon substituents.

The borazoles, used as reactants in the present invention, are heterocyclic ring compounds having the formula $(XBNR')_3$, the substituents, X and R', defined in the foregoing broadly stated paragraph, are attached to the boron and nitrogen atoms of the borazole ring, and are named with "B" and "N" prefixes to designate their position. As can be seen from the foregoing definitions of the substituents, the substitutions on the boron and nitrogen atoms can all be the same or they can be mixed.

The following list is illustrative of the substituted borazoles containing the same substituents on all of the boron and nitrogen atoms:

Hexamethylborazole
Hexaethylborazole
Hexa-n-propylborazole
Hexaisopropylborazole
Hexa-sec-propylborazole
Hexa-n-butylborazole
Hexaisobutylborazole
Hexa-sec-butylborazole
Hexa-n-pentylborazole
Hexa-n-octylborazole
Hexastearylborazole
Hexaphenylborazole
Hexa(2-methylphenyl)borazole
Hexa(biphenylyl)borazole
Hexa-α-naphthylborazole The following list is illustrative of the substituted borazoles having intermixed substituents on the boron and nitrogen atoms of the borazole ring:

B-trichloroborazole
B-tribromoborazole
B-triethylborazole
B-triphenylborazole
B-triphenyl-N-trimethylborazole
B-triethyl-N-triisopropylborazole
B-trimethyl-N-tris(biphenylyl)borazole
B-triphenoxy-N-tri-n-butylborazole
B-trimethoxy-N-trimethylborazole
B-tris(quinoline-8-oxy)-N-triethylborazole
B-trichloro-N-triphenylborazole
B-tri-α-naphthyl-N-tri-n-pentylborazole
B-tri-n-octyl-N-triphenylborazole
B-tris(2-methylphenyl)-N-tri-n-butylborazole
B-triisopropoxy-N-trimethylborazole
B-tris(biphenylyl)-N-triphenylborazole
B-trimethyl-N-triethylborazole
N-trimethylborazole
N-triphenylborazole It is to be clearly understood that the foregoing lists of substituted borazoles are only a partial enumeration of the substituted borazoles applicable to the present invention. The foregoing lists are shown to illustrate the substituted borazoles and are not intended to limit the invention.

The following list is illustrative of the aluminum compound, trialkylaluminums and triarylaluminums, applicable to the present invention:

Trimethylaluminum
Triethylaluminum
Tri-n-propylaluminum
Triisopropylaluminum
Tri-n-butylaluminum
Tri-sec-butylaluminum
Tri-n-octylaluminum
Tri-n-dodecylaluminum
Triphenylaluminum
Tri(2-methylphenyl)aluminum
Tri(3-ethylphenyl)aluminum The above list is only a partial enumeration of the trialkyl- and triarylaluminums which are applicable to the present invention. In the preferred embodiment of the invention, however, I use the trialkylaluminums where the alkyl group is unsubstituted and saturated and contains from 1 to 4 carbon atoms since these are the most readily commercially available and most easily synthesized of the aluminum compounds which are applicable to this invention.

The common hydrocarbon solvents are all applicable to the present invention, the only requirements being that they are anhydrous, inert to the organoborane and have a boiling point greater than that of the organoborane produced. The following list is illustrative of these solvents:

Benzene
Toluene
Xylene
Mineral oil
Methylnaphthylene
Dodecane
Alkyl-substituted toluene
Nonane So that the present invention can be more clearly understood, the following examples are given for illustrative purposes:

I

To a slurry of 1.84 grams (0.01 mole) of B-trichloroborazole in 35 ml. of dodecane was added 4.3 ml. (0.032 mole) of triethylaluminum. The reaction was exothermic and the flask was cooled in an ice bath. The reaction mass was then heated and distilled for about a one-hour period and 2.37 grams (81% yield) of triethylborane was recovered. A white residual solid was recovered from the remaining slurry. The white solid material was found to be infusible and insoluble in organic solvents and when analyzed was found to contain no boron. The infrared spectrum and vapor pressure determinations at 0° C. and 25° C. showed the recovered distillate to be pure triethylborane, B.P. 95° C. Chemical analysis of the distillate yielded the following data:

B in $B(C_2H_5)_3$: Calc.=11.04%. Found=11.04%.

II

To a stirred slurry of 3.08 grams (0.01 mole) of B-triphenylborazole in 35 ml. of dodecane was added 4.1 ml. (0.030 mole) of triethylaluminum. On warming, the slurry became a clear, colorless solution. The solution was then heated and distilled for a period of about 1.5 hours to yield 2.35 grams (80% yield) of triethylborane, B.P. 92–95.5° C. Chemical analysis of the distillate yielded the following data:

B in $B(C_2H_5)_3$: Calc.=11.04%. Found=11.01%.

A white solid separated from the residual solution on cooling. Further evaporation of the liquid from the slurry increased the amount of solid recovered. The white solid was found to be infusible at below 500° C. and was only partially soluble in organic solvents. The soluble portion was tested and was found to contain trace quantities of boron. Chemical analysis of the white solid resinous material yielded the following data:

Al in $(C_6H_5AlNH)_n$: Calc.=22.65%. Found=22.71 percent.

III

To a stirred slurry of 3.45 grams (0.01 mole) of B-triphenyl-N-trimethylborazole in 50 ml. of mineral oil was added 4.68 grams (0.03 mole) of triisopropylaluminum. On warming, the slurry became a clear, colorless solution. The solution was then heated and distilled for a period of about 2 hours to yield 3.44 grams (82% yield) of triisopropylborane, B.P. 31.5–35.5° C./12 mm. Chemical analysis of the distillate yielded the following data:

B in $B(C_3H_7)_3$: Calc.=7.72%. Found=7.74%.

A white solid resinous material separated from the residual solution on cooling. Further distillation of the solvent yielded an increased amount of the resin. The white solid was found to be infusible below 500° C. and was only partially soluble in organic solvents. The soluble portion was tested and found to contain trace quantities of boron. Chemical analysis of the solid resinous material yielded the following data:

Al in $(C_6H_5AlNCH_3)_n$: Calc.=20.30%. Found=20.07%.

IV

To a stirred slurry of 4.02 grams (0.01 mole) of B-tribromo-N-triethylborazole in 50 ml. of xylene was added 2.16 grams (0.03 mole) of trimethylaluminum. The reaction was exothermic and the flask was cooled in an ice bath. The reaction mass was heated and distilled for about 1 hour and 1.41 grams (84% yield) of trimethylborane was collected in a Dry Ice-acetone trap. A white solid material was then recovered from the residual slurry by filtration. The white solid was infusible and completely insoluble in organic solvents. Chemical analysis of the material collected in the Dry Ice-acetone trap yielded the following data:

B in $B(CH_3)_3$: Calc.=19.35%. Found=19.31%.

V

To a solution of 1.65 grams (0.01 mole) of hexamethylborazole in 35 ml. of dodecane was added 4.3 ml. (0.032 mole) of triethylaluminum. The resultant reaction mass was heated and distilled through a short Vigreux column and 1.82 grams (61.5% yield) of triethylborane in addition to a small quantity of a lower boiling borane, which later was found to be trimethylborane, was recovered. The distillate was separated by fractional distillation and the triethylborane, B.P. 95° C., was analyzed. Chemical analysis yielded the following data:

B in $B(C_2H_5)_3$: Calculated=11.04%. Found=11.03%.

The residual yellow solution was evaporated in vacuo and a yellow resin was recovered. The yellow resin was dissolved in benzene, the solution was filtered and the benzene was removed from the filtrate in vacuo. The yellow resin melted at between 104° C.–115° C., did not decompose below 340° C., and was soluble in organic solvents. Cryoscopic molecular weight determinations in benzene showed the molecular weight to be about 1440. The resin was analyzed and the analysis yielded the following data:

Al in $[B(C_2H_5)_3Al_3N_3(CH_3)_6]_n$: Calculated=26.0%. Found=27.9%. B in polymer: Calculated=3.48%. Found=3.11%.

VI

To a solution of 3.33 grams (0.01 mole) of B-tri-n-hexylborazole in 50 ml. of methylnaphthylene was added 5.94 grams (0.03 mole) of triisobutylaluminum. The resultant solution was then heated and distilled for about 2 hours; 3.39 grams (62.1% yield) of triisobutylborane, B.P. 85–86° C./20 mm. was recovered. Chemical analysis yielded the following data:

B in $B(C_4H_9)_3$: Calculated=5.94%. Found=5.92%.

The residual solution was evaporated in vacuo and a yellow resin was recovered. The yellow resin, which was soluble in benzene, melted at between 250°–270° C. and did not decompose below 320° C. The yellow resin was soluble in most organic solvents and cryoscopic molecular weight determinations in benzene showed the molecular weight to be about 2370. The resin was analyzed and the analysis yielded the following data:

Al in $[B(C_4H_9)_3Al_3H_3N_3(C_6H_{13})_3]_n$: Calculated=14.36%. Found=14.89%. B in polymer: Calculated=1.92%. Found=1.76%.

The reactions of the preceding examples can best be illustrated by the following equations:

(a) The reaction of the organoaluminum compound with a substituted borazole having halogen and/or aromatic hydrocarbon substituents. (Examples I, II, III and IV.)

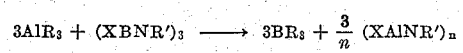

(b) The reaction of the organoaluminum compound with a substituted borazole having unsubstituted saturated aliphatic hydrocarbon substituents. (Examples V and VI.)

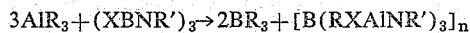

The yield of organoboranes given in the examples were based on the assumption that 3 moles of organoborane would be produced. Since this is not the case in Reaction b and only 2 moles of organoborane are possible, the yields are actually on the order of 90 to 95%.

The solubilities, in organic solvents, of the polymeric materials produced seem to be directly associated with their boron content. The polymeric materials produced in the reaction involving substituted borazoles having halogen substituents contain no boron and are insoluble, those produced by the reaction involving substituted borazoles containing aromatic hydrocarbon substituents contain trace quantities of boron and are partially soluble, while the polymeric materials produced in the reaction involving substituted borazoles containing unsubstituted saturated aliphatic hydrocarbon substituents contain appreciable amounts of boron and are completely soluble.

The organoaluminum-nitrogen polymers of the present invention are thermally stable at temperatures of from about 200° C. to about 500° C. The degree of thermal stability of these compounds is dependent on the radicals substituted on the aluminum and nitrogen atoms comprising the polymers. As can be seen from the foregoing description, the radicals substituted on the aluminum and nitrogen atoms are predetermined by the substituted borazole chosen as a reactant.

The polymers of the present invention find utility as casting and molding resins and as protective coatings for various types of wire and cloth for use at elevated temperatures. The organoboranes produced are used in various jet fuel compositions and are also valuable chemical intermediates.

As can be seen from the foregoing examples, the present process is rapid and can be performed in standard commercially available equipment. Thus, the present invention provides a single-step reaction wherein high yields of substantially pure organoboranes and useful organoaluminum-nitrogen polymers are produced in an economically desirable manner.

Other modes of applying the principle of the invention may be employed, change being made as regards the details described, provided the features stated in any of the following claims or the equivalent of such be employed.

I, therefore, particularly point out and distinctly claim as my invention:

1. The method for preparing organoboranes and organoaluminum-nitrogen polymers which comprises reacting a substituted borazole having the formula (XBNR')₃ with an organoaluminum compound having the formula AlR₃ in an inert solvent, slowly distilling the reaction mass, recovering substantially pure organoborane as the distillate and recovering said organoaluminum-nitrogen polymers from the residue, where R is selected from the group consisting of unsubstituted saturated aliphatic hydrocarbon radicals, phenyl and lower alkyl substituted phenyl radicals, X is selected from the group consisting of chlorine, bromine, unsubstituted saturated alkoxy radicals, phenoxy radicals, quinoline-8-oxy, unsubstituted saturated aliphatic hydrocarbon radicals, unsubstituted aromatic hydrocarbon radicals, lower alkyl substituted aromatic hydrocarbon radicals and biphenylyl, and R' is selected from the group consisting of hydrogen, unsubstituted saturated aliphatic hydrocarbon radicals, unsubstituted aromatic hydrocarbon radicals, lower alkyl substituted aromatic hydrocarbon radicals and biphenylyl.

2. The method for preparing organoboranes and organoaluminum-nitrogen polymers which comprises reacting a substituted borazole having the formula (XBNR')₃ with a trialkylaluminum having the formula AlR₃ in an inert solvent, slowly distilling the reaction mass, recovering substantially pure organoborane as the distillate and recovering said organoaluminum-nitrogen polymer from the residue, where R is an unsubstituted saturated aliphatic hydrocarbon radical containing from 1 to 4 carbon atoms, X is selected from the group consisting of chlorine, bromine, unsubstituted saturated alkoxy radicals, phenoxy radicals, quinoline-8-oxy unsubstituted saturated aliphatic hydrocarbon radicals, unsubstituted aromatic hydrocarbon radicals, lower alkyl substituted aromatic hydrocarbon radicals and biphenylyl, and R' is selected from the group consisting of hydrogen, unsubstituted saturated aliphatic hydrocarbon radicals, unsubstituted aromatic hydrocarbon radicals, lower alkyl substituted aromatic hydrocarbon radicals and biphenylyl.

3. The method for preparing organoboranes and organoaluminum-nitrogen polymers which comprises reacting a substituted borazole having the formula (XBNR')₃ with a trialkylaluminum having the formula AlR₃ in an inert solvent, slowly distilling the reaction mass, recovering substantially pure organoborane as the distillate and recovering an organoaluminum-nitrogen polymer from the residue, where X is bromine, and R' and R are lower alkyl having from 1 to 4 carbon atoms.

4. The method for preparing organoboranes and organoaluminum-nitrogen polymers which comprises reacting a substituted borazole having the formula (XBNR')₃ with a trialkylaluminum having the formula AlR₃ in an inert solvent, slowly distilling the reaction mass, recovering substantially pure organoborane as the distillate and recovering an organoaluminum-nitrogen polymer from the residue, where X is chlorine, R' is hydrogen and R is lower alkyl having from 1 to 4 carbon atoms.

5. The method for preparing organoboranes and organoaluminum-nitrogen polymers containing boron which comprises reacting a substituted borazole having the formula (XBNR')₃ with a trialkylaluminum having the formula AlR₃ in an inert solvent, slowly distilling the reaction mass, recovering substantially pure organoborane as the distillate and recovering an organoaluminum-nitrogen polymer containing boron from the residue where X is an unsubstituted aromatic hydrocarbon radical, R' is hydrogen and R is lower alkyl having from 1 to 4 carbon atoms.

6. The method for preparing organoboranes and organoaluminum-nitrogen polymers containing boron which comprises reacting a substituted borazole having the formula (XBNR')₃ with a trialkylaluminum having the formula AlR₃ in an inert solvent, slowly distilling the reaction mass, recovering substantially pure organoborane as the distillate and recovering an organoaluminum-nitrogen polymer containing boron from the residue, where X is an unsubstituted aromatic hydrocarbon radical, R' and R are lower alkyl having from 1 to 4 carbon atoms.

7. The method for preparing organoboranes and organoaluminum-nitrogen boron polymers which comprises reacting a substituted borazole having the formula (XBNR')₃ with a trialkylaluminum having the formula AlR₃ in an inert solvent, slowly distilling the reaction mass, recovering substantially pure organoborane as the distillate and recovering an organoaluminum-nitrogen-boron polymer from the residue, where X is an unsubstituted saturated aliphatic hydrocarbon radical, R' is hydrogen and R is lower alkyl having from 1 to 4 carbon atoms.

8. The method for preparing organoboranes and organoaluminum-nitrogen-boron polymers which comprises reacting a substituted borazole having the formula (XBNR')$_3$ with a trialkylaluminum having the formula AlR$_3$ in an inert solvent, slowly distilling the reaction mass, recovering substantially pure organoborane as the distillate and recovering an organoaluminum-nitrogen-boron polymer from the residue, where X and R' are unsubstituted saturated aliphatic hydrocarbon radicals and R is lower alkyl having from 1 to 4 carbon atoms.

9. The method for perparing triethylborane and an organoaluminum-nitrogen polymer which comprises reacting B-trichloroborazole with triethylaluminum in anhydrous dodecane, slowly distilling the resultant reaction mass, recovering substantially pure triethylborane as the distillate and recovering said organoaluminum-nitrogen polymer from the residual slurry.

10. The method for preparing trimethylborane and an organoaluminum-nitrogen polymer which comprises reacting B-tribromo-N-triethylborazole with trimethylaluminum in anhydrous xylene, slowly distilling the resultant reaction mass, recovering substantially pure trimethylborane as the distillate and recovering said organoaluminum-nitrogen polymer from the residual slurry.

11. The method for preparing triisopropylborane and an organoaluminum-nitrogen polymer containing boron which comprises reacting B-triphenyl-N-trimethylborazole with triisopropylaluminum in anhydrous mineral oil, slowly distilling the resultant reaction mass, recovering substantially pure triisopropylborane as the distillate and recovering said organoaluminum-nitrogen polymer containing boron from the residue.

12. The method for preparing triethylborane and an organoaluminum-nitrogen polymer containing boron which comprises reacting B-triphenylborazole with triethylaluminum in anhydrous dodecane, slowly distilling the resultant reaction mass, recovering substantially pure triethylborane as the distillate and recovering said organoaluminum - nitrogen polymer containing boron from the residue.

13. The method for preparing triisobutylborane and an organoaluminum-nitrogen-boron polymer which comprises reacting B-tri-n-hexylborazole with triisobutylaluminum in anhydrous methylnaphthalene, slowly distilling the resultant reaction mass, recovering substantially pure triisobutylborane as the distillate and recovering said organoaluminum-nitrogen-boron polymer from the residue.

14. The method for preparing triethylborane and an organoaluminum-nitrogen-boron polymer which comprises reacting hexamethylborazole with triethylaluminum in anhydrous dodecane, slowly distilling the resultant reaction mass, recovering substantially pure triethylborane as the distillate and reovering said organoaluminum-nitrogen-boron polymer from the residue.

References Cited by the Examiner
UNITED STATES PATENTS 2,892,869  6/59  Groszoa et al. _____ 260—551
2,934,566  4/60  Murib et al. _____ 260—606.5

OTHER REFERENCES

Ashby: Journal American Chemical Society, vol. 81, pages 4791–4795 (1959).

MURRAY TILLMAN, *Primary Examiner.*

MILTON STERMAN, J. R. LIBERMAN, I. D. QUARFORTH, *Examiners.*